United States Patent
Schmidl et al.

(10) Patent No.: US 6,917,597 B1
(45) Date of Patent: Jul. 12, 2005

(54) SYSTEM AND METHOD OF COMMUNICATION USING TRANSMIT ANTENNA DIVERSITY BASED UPON UPLINK MEASUREMENT FOR THE TDD MODE OF WCDMA

(75) Inventors: Timothy M. Schmidl, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/523,329

(22) Filed: Mar. 10, 2000

Related U.S. Application Data

(60) Provisional application No. 60/146,619, filed on Jul. 30, 1999, and provisional application No. 60/146,477, filed on Jul. 30, 1999.

(51) Int. Cl.⁷ .................................................. H04J 3/00
(52) U.S. Cl. ........................ 370/280; 370/294; 375/267
(58) Field of Search ................................ 370/276, 277, 370/280, 293, 294, 328, 329, 330, 335, 336, 342, 343, 441, 442; 375/260, 267

(56) References Cited

U.S. PATENT DOCUMENTS

| 5,280,472 | A | * | 1/1994 | Gilhousen et al. | 370/335 |
| 5,437,055 | A | * | 7/1995 | Wheatley, III | 455/429 |
| 5,564,074 | A | * | 10/1996 | Juntti | 455/67.11 |
| 5,577,265 | A | * | 11/1996 | Wheatley, III | 370/335 |
| 5,598,404 | A | * | 1/1997 | Hayashi et al. | 370/342 |
| 5,828,658 | A | * | 10/1998 | Ottersten et al. | 370/310 |
| 5,920,286 | A | * | 7/1999 | Mohebbi | 342/383 |
| 5,926,470 | A | * | 7/1999 | Tiedemann, Jr. | 370/334 |
| 5,960,330 | A | * | 9/1999 | Azuma | 455/70 |
| 6,108,364 | A | * | 8/2000 | Weaver et al. | 375/130 |
| 6,192,038 | B1 | * | 2/2001 | Wallerius et al. | 370/328 |
| 6,259,687 | B1 | * | 7/2001 | Lomp et al. | 370/342 |
| 6,307,851 | B1 | * | 10/2001 | Jung et al. | 370/342 |
| 6,314,304 | B1 | * | 11/2001 | Uesugi | 455/562.1 |
| 6,389,572 | B1 | * | 5/2002 | Garrabrant et al. | 714/780 |
| 6,473,447 | B1 | * | 10/2002 | Strich et al. | 375/130 |
| 6,483,826 | B1 | * | 11/2002 | .ANG.kerberg | 370/335 |

OTHER PUBLICATIONS

"On the System Design Aspects of Code Division Multiple Access (CDMA) Applied to Digital Cellular and Personal Communications Networks," Vehicular Technology Conference 1991, CH2944–7/91/0000/0057, 1991 IEEE, pp. 57–62 (Allen Salmasi and Klein S. Gilhousen).

"Joint Detection With Coherent Receiver Antenna Diversity in CDMA Mobile Radio Systems," IEEE Transactions on Vehicular Technology, vol. 44, No. 1, Feb. 1995, pp. 76–88 (Peter Jung and Josef Blanz).

"Zero Forcing and Minimum Mean–Square–Error Equalization for Multiuser Detection in Code–Division Multiple–Access Channels," IEEE Transactions on Vehicular Technology, vol. 45, No. 2, May 1996, pp. 276–287 (Anja Klein, Ghassan Kawas Kaleh, Paul Walter Baier).

\* cited by examiner

Primary Examiner—Bob A. Phunkulh
(74) Attorney, Agent, or Firm—Ronald O. Neerings; Wades James Brady, III; Frederick J. Telecky, Jr.

(57) ABSTRACT

A system and method of data communication uses variable transmit antenna delays based on uplink measurements for the time division duplex (TDD) mode of WCDMA communication. The signals for each channel are delayed at baseband, so different delays can be used for each channel. The delay between each antenna is chosen so that the strongest paths do not overlap in order to implement full transmit antenna diversity. The transmitted signals are detected at a mobile terminal via a joint detector to eliminate noise from other mobile terminals within the cell.

60 Claims, 5 Drawing Sheets

SYSTEM AND METHOD OF COMMUNICATION USING TRANSMIT ANTENNA DIVERSITY BASED UPON UPLINK MEASUREMENT FOR THE TDD MODE OF WCDMA

CLAIM TO PRIORITY OF PROVISIONAL APPLICATION

The application claims priority under 35 U.S.C. § 119(e)(1) of provisional application Ser. No. 60/146,619, filed Jul. 30, 1999, by Timothy M. Schmidl and Anand G. Dabak and further claims priority under 35 U.S.C. §119(e)(1) of provisional application Ser. No. 60/146,477, filed Jul. 30, 1999, by Timothy M. Schmidl and Anand G. Dabak.

BACKGROUND OF THE INVENTION

1. Field of the Invention

This invention relates generally to wideband code division multiple access (WCDMA) for a communication system and more particularly to a system and method of data communication using transmit antenna diversity based on uplink measurements for the time division duplex (TDD) mode of WCDMA.

2. Description of the Prior Art

Present code division multiple access (CDMA) systems are characterized by simultaneous transmission of different data signals over a common channel by assigning each signal a unique code. This unique code is matched with a code of a selected receiver, i.e., mobile terminal, to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in U.S. patent application Ser. No. 9/205,029, filed Dec. 3, 1998, and incorporated herein by reference. Therein, Dabak et al. describe a method of space time transmit diversity (STTD) for frequency division duplex (FDD) WCDMA systems. These FDD systems are coherent communications systems with pilot symbol assisted channel estimation schemes. These pilot symbols are transmitted as quadrature phase shift keyed (QPSK) known data in predetermined time frames to any receivers within range. The frames may propagate in discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames include pilot symbols as well as other control symbols such as transmit power control (TPC) symbols and rate information (RI) symbols. These control symbols include multiple bits otherwise known as chips to distinguish them from data bits. The chip transmission time (Tc), therefore, is equal to the symbol rate (T) divided by the number of chips in the symbol (G).

Time division duplex (TDD) provides an alternative communication standard for WCDMA, FDD systems. TDD data are transmitted as QPSK symbols in data packets of a predetermined duration or time slot. Each data packet includes a training sequence or midamble within the time slot. Data packets are exchanged within a cell formed by a base station in communication with nearby mobile units. Data in adjacent cells are modulated by different periodic codes. The midamble is formed by adding time shifted versions of the same basic sequence with each time shift corresponding to a mobile unit within the cell. The spreading factor (SF) or chips per symbol of the modulation is preferably sixteen or less. Since the periodic code within the cell is the same and the spreading factor is small, however, interference from the base station and other mobile units within the cell is not received as Gaussian noise. Typical matched filter circuits used in FDD systems, therefore, are unsuitable for eliminating this intra cell interference. A solution to this problem was presented by Anja Klein et al., *Zero Forcing and Minimum Mean-Square-Error Equalization for Multiuser Detection in Code-Division Multiple-Access Channels*, IEEE Transactions on Vehicular Technology, 276–287 (1996). Therein, Klein et al. teach zero forcing (ZF) and minimum mean-square-error (MMSE) equalization with and without decision feedback (DF) to reduce both inter-symbol interference (ISI) and multiple-access interference (MAI). Klein et al. further cites P. Jung, J. Blanz and P. W. Baier, *Coherent Receiver Antenna Diversity for CDMA Mobile Radio Systems Using Joint Detection*, Proc. IEEE Int. Symp. Pers. Indoor and Mobile Radio Communications, 488–492 (1993), for the proposition that these techniques may be used in combination with antenna diversity.

Delay diversity is a method of transmit antenna diversity in which the same signal is transmitted from multiple antennas, with each antenna having a different time delay. Delay diversity was introduced for TDMA systems such as IS-54 and GSM (global system for mobile communications) by N. Seshadri and J. Winters, *Two Signaling Schemes for Improving the Error Performance of Frequency-Division-Duplex (FDD) Transmission Systems Using Transmitter Diversity*, Vehicular Technology Conference, pp. 508–511 (1993) and A. Wittneben, *A New Bandwidth Efficient Transmit Antenna Modulation Diversity Scheme for Linear Digital Modulation*, International Communications Conference, vol. 3, pp. 1630–1634 (1993), wherein the delays for each antenna are chosen to be a multiple of the symbol interval. Delay diversity for a synchronous CDMA system (IS-95) was disclosed in U.S. Pat. No. 5,781,541, entitled *CDMA System Having Time-Distributed Transmission Paths for Multipath Reception*, by A. Schneider, issued Jul. 14, 1998 wherein the delays for each antenna are greater than a chip interval and less than the base station sequence offset between base stations. The Seshadri et al., Wittneben and Schneider references are incorporated by reference herein. Delay diversity for another CDMA communication system and using a distributed antenna system to provide multipath signals in order to facilitate signal diversity for enhanced system performance was disclosed by Gilhousen, et al. in U.S. Pat. No. 5,280,472, entitled CDMA Microcellular Telephone System and Distributed Antenna System Therefor, issued Jan. 18, 1994. A communication system having the advantages of delay diversity associated with TDD base terminals in combination with joint detection at the mobile terminals is, however, presently unknown. In view of the above, a wireless communication system having variable transmit antenna delays based on uplink measurements associated with the TDD mode of WCDMA in combination with joint detection of the transmitted signals at the mobile terminal is both advantageous and desirable.

SUMMARY OF THE INVENTION

The present invention is directed to a communication system using variable transmit antenna delays associated with multiple antennas, with each antenna having a different time delay, based upon uplink measurements for the TDD mode of WCDMA. The signals for each channel are delayed at baseband, so different delays can be used for each channel. Since the base station must measure the delay profile in the uplink to receive the uplink transmission, there is no additional complexity involved in measuring the positions of the paths in the uplink for the TDD mode. Since this system is a time division duplex (TDD) system, the uplink and downlink profiles are the same. The delay between the antennas can be chosen so that the strongest paths do not overlap so that full diversity can be achieved. For broadcast channels transmitted to all mobile terminals, there is less flexibility in choosing the delays between antennas since the same delay is used for all users. In this case, the antenna delays can be chosen so as to benefit the maximum number of users or the users at the edge of the cell.

Thus, a method of communicating data between a base station having a plurality of antennas and at least one mobile terminal according to one embodiment of the present invention comprises the steps of:

transmitting from the base station, derived versions of a midamble signal to each antenna within the plurality of antennas; and providing a distinct delay associated with each derived version of the midamble signal and its respective antenna.

Another embodiment of the present method for communicating data between a base station having a plurality of antennas and at least one mobile terminal comprises the steps of:

receiving at the base station, a time division duplex mode uplink signal from each mobile terminal in communication with the base station and estimating a path profile associated with each received uplink signal;

transmitting from the base station, a time division duplex signal to each antenna within the plurality of antennas; and providing a distinct delay associated with each time division duplex signal and its respective antenna.

A communication system according to one embodiment of the present inventions comprises:

a base station having a plurality of spaced apart antennas;

signal distribution means for coupling time division duplex communication signals between the base station and the plurality of spaced apart antennas; and delay means operatively coupled to the antennas and the signal distribution means for providing a distinct delay in each of the time division duplex communication signals to coupled between the base station and the plurality of spaced apart antennas.

A data communication system according to another embodiment of the present invention comprises:

a base station having a plurality of spaced apart antennas;

at least one mobile terminal in communication with the base station; and means for providing a distinct delay associated with each antenna such that a time division duplex communication signal coupled between the base station and the plurality of spaced apart antennas can be demodulated within the at least one mobile terminal.

A data communication system according to yet another embodiment of the present invention comprises:

a base station having a plurality of spaced apart antennas;

means for transmitting from the base station, derived versions of a midamble signal to each antenna within the plurality of spaced apart antennas; and means for providing a distinct delay associated with each derived version of the midamble signal and its respective antenna within the plurality of spaced apart antennas.

A data communication system according to still another embodiment of the present invention comprises:

a base station configured to communicate with the at least one mobile terminal, the base station having a plurality of spaced apart antennas and further having:

a data processor;

a data input device in communication with the data processor;

an algorithmic software directing the data processor; and a data storage unit, wherein discrete signal uplink data associated with at least one mobile terminal in communication with the base station is stored and supplied to the data processor such that the data processor, directed by the algorithmic software, can automatically derive midamble signal parameters using algorithmically defined relationships associated with the discrete signal uplink data such that derived midamble signals communicated between the base unit and each respective antenna will be characterized by at least one distinct signal parameter selected from the group consisting of signal delay, signal phase and signal amplitude.

A time-division duplex (TDD) data communication system according to yet another embodiment of the present invention in which system users communicate information signals through a base station using TDD communication signals, comprises a base station having an antenna system comprising:

a plurality of spaced apart antennas;

signal distribution means for coupling TDD communication signals between a base station and the plurality of spaced apart antennas; and variable delay means operatively coupled to the plurality of spaced apart antennas and the signal distribution means for providing derived delays associated with the TDD communication signals and the plurality of spaced apart antennas.

As used herein, the following words have the following meanings. The words "algorithmic software" means an algorithmic program used to direct the processing of data by a computer or data processing device. The words "data processing device" as used herein refer to a CPU, DSP, microprocessor, micro-controller, or other like device and an interface system. The interface system provides access to the data processing device such that data could be entered and processed by the data processing device. The words "discrete data" as used herein are interchangeable with "digitized data" and "digitized data" as used herein means data which are stored in the form of singularly isolated, discontinuous data or digits.

In another aspect of the invention, a multiple transmit antenna base station utilizes delay diversity to deliver TDD signals to a mobile terminal.

In yet another aspect of the invention, a multiple transmit antenna base station utilizes delay diversity to deliver signals to a mobile terminal having a joint detector to accommodate signal demodulation associated with the TDD mode of WCDMA.

In another aspect of the invention, a multiple transmit antenna base station utilizes adaptive variable delay diversity to accommodate the TDD mode of WCDMA data communication.

In yet another aspect of the invention, a multiple transmit antenna base station utilizes adaptive variable delay diversity in combination with a training midamble to generate multiple communication channel delay characteristics.

In still another aspect of the invention, a communication system comprises a multiple transmit antenna base station utilizing adaptive variable delay diversity in combination with a joint detector at the mobile receiver to remove interference from other users on the same cell.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
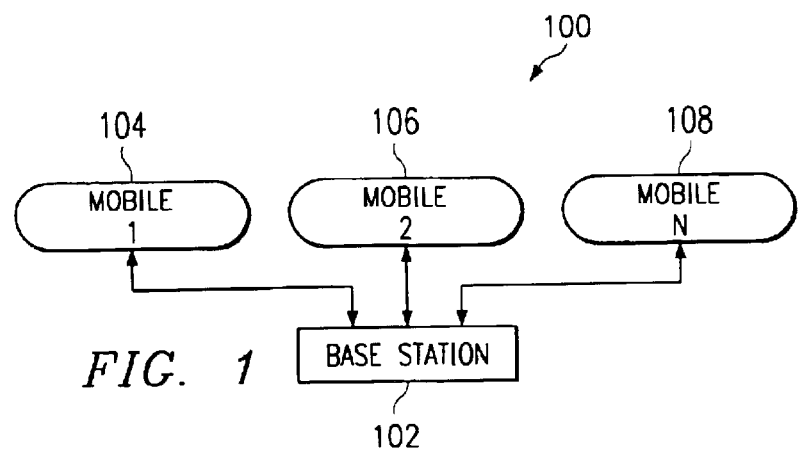
FIG. 1 is a block diagram of a typical cell showing a single base station in communication with a plurality of mobile terminals.

FIG. 1 is a block diagram of a typical cell 100 showing a single base station 102 in communication with a plurality of mobile terminals 104, 106, 108. These devices communicate within the cell 100 using the TDD mode of WCDMA data communication as will be described in detail herein. Delay diversity within the cell 100 is accomplished by transmitting derived versions of the same signal from different antennas with at least one distinct delay between any two antennas. The derived versions of the signal are obtained by scaling the amplitude and/or phase shifting. The simplest form of delay diversity would involve simply transmitting the same signal from different antennas with at least one distinct delay between any two antennas.

Figure 2:
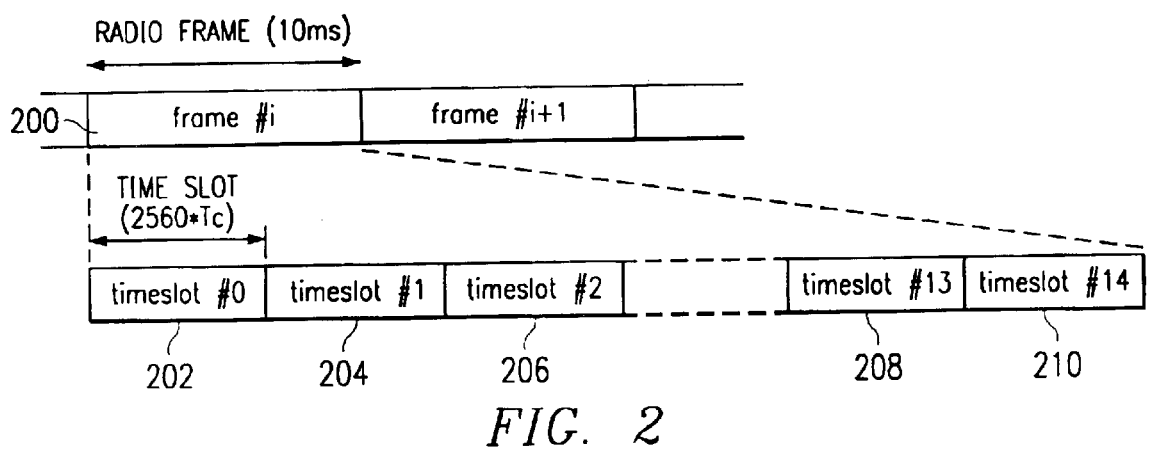
FIG. 2 is a diagram of a TDD radio frame.
Figure 3:
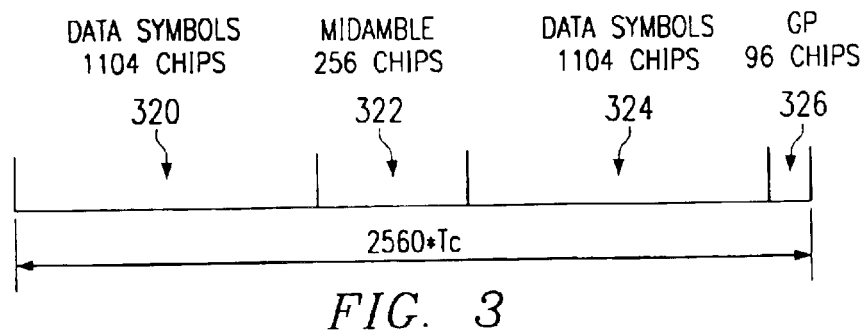
FIG. 3 is a diagram of a time slot within the radio frame of FIG. 2.

FIG. 2 is a diagram of a TDD radio frame 200 that may be transmitted by the communication system of FIG. 1. The radio frame 200 can be seen to have a duration of 10 msec. The radio frame is divided into 15 equal time slots 202–210. Each of these time slots 202–210 is further divided into 2560 chip times Tc. The diagram of FIG. 3 illustrates the structure of a single TDD time slot. The time slot includes a first group of data symbols 320 having 1104 chips. This first group corresponds to 69 data symbols for an exemplary spreading factor of 16. The first group is followed by a midamble 322 having 16 symbols for the exemplary spreading factor of 16. These midamble symbols are a predetermined training sequence similar to pilot symbols of FDD systems discussed herein above. The midamble 322 symbols are cyclically time shifted for different users in the cell as previously discussed. A second group of data symbols 324 having another 1104 chips follows the midamble 322. Finally, the second group of data symbols 324 is followed by a guard period 326 of 96 chips.

Figure 4A:
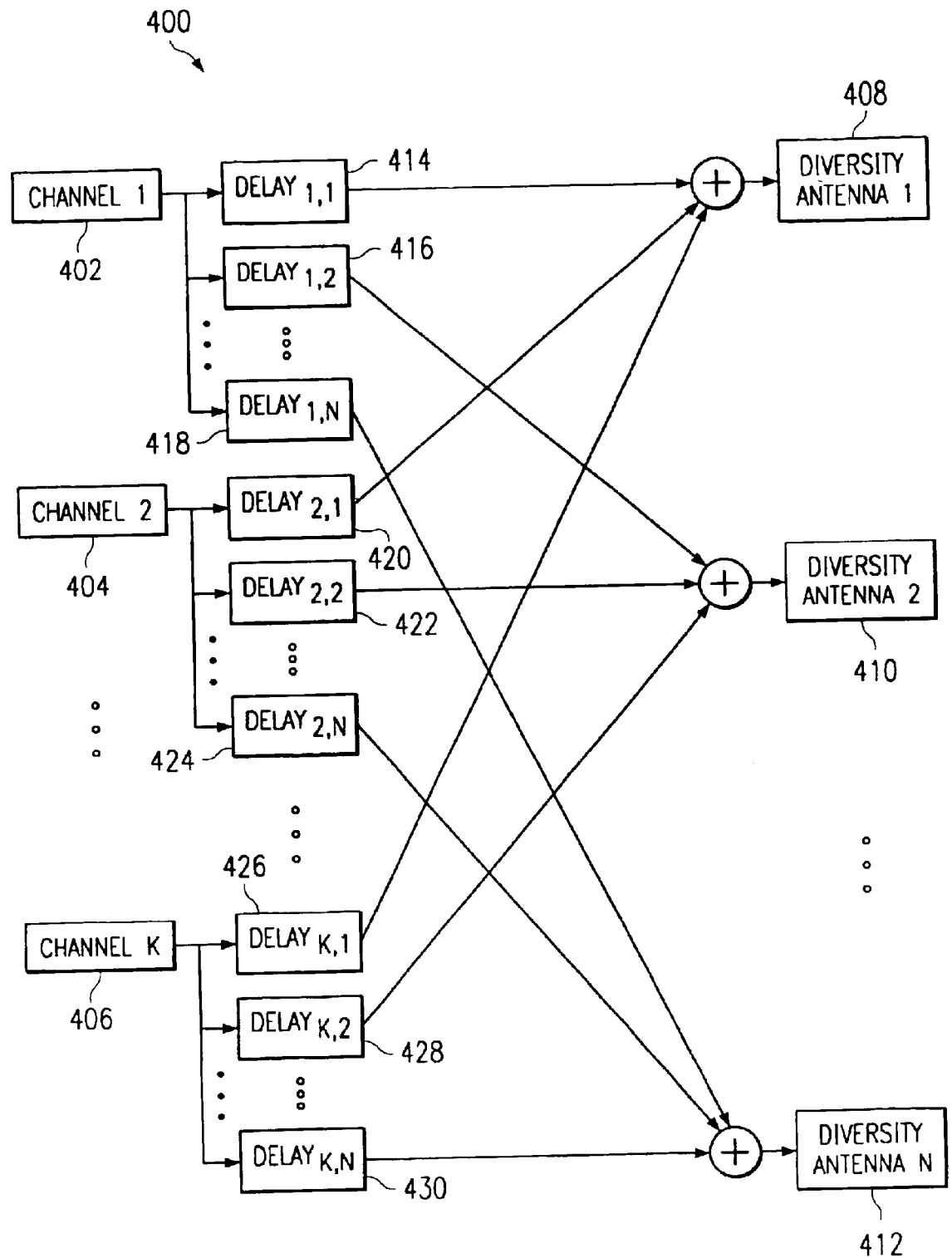
FIG. 4(a) is a block diagram illustrating one implementation of delay diversity at the base station shown in FIG. 1 and having K channels and N antennas suitable for accommodating the TDD mode of WCDMA data communication according to one embodiment of the present invention.

FIG. 4(a) is a block diagram 400 illustrating one implementation of delay diversity at the base station 102 shown in FIG. 1 and having K channels 402–406 and N antennas 408–412 suitable for accommodating the TDD mode of WCDMA data communication according to one embodiment of the present invention. Transmit antenna delay diversity is generally implemented with fixed delays for each antenna 408–412 (usually a 1-chip delay per antenna). Delay diversity, as stated above, is a method of transmit antenna diversity in which the same signal is transmitted from multiple antennas, with each antenna having a different time delay for the same signal. With continued reference to FIG. 4(a), the signals associated with each channel 402–406 are delayed at baseband, so different delays 414–430 can be used for each channel 402–404.

Figure 4B:
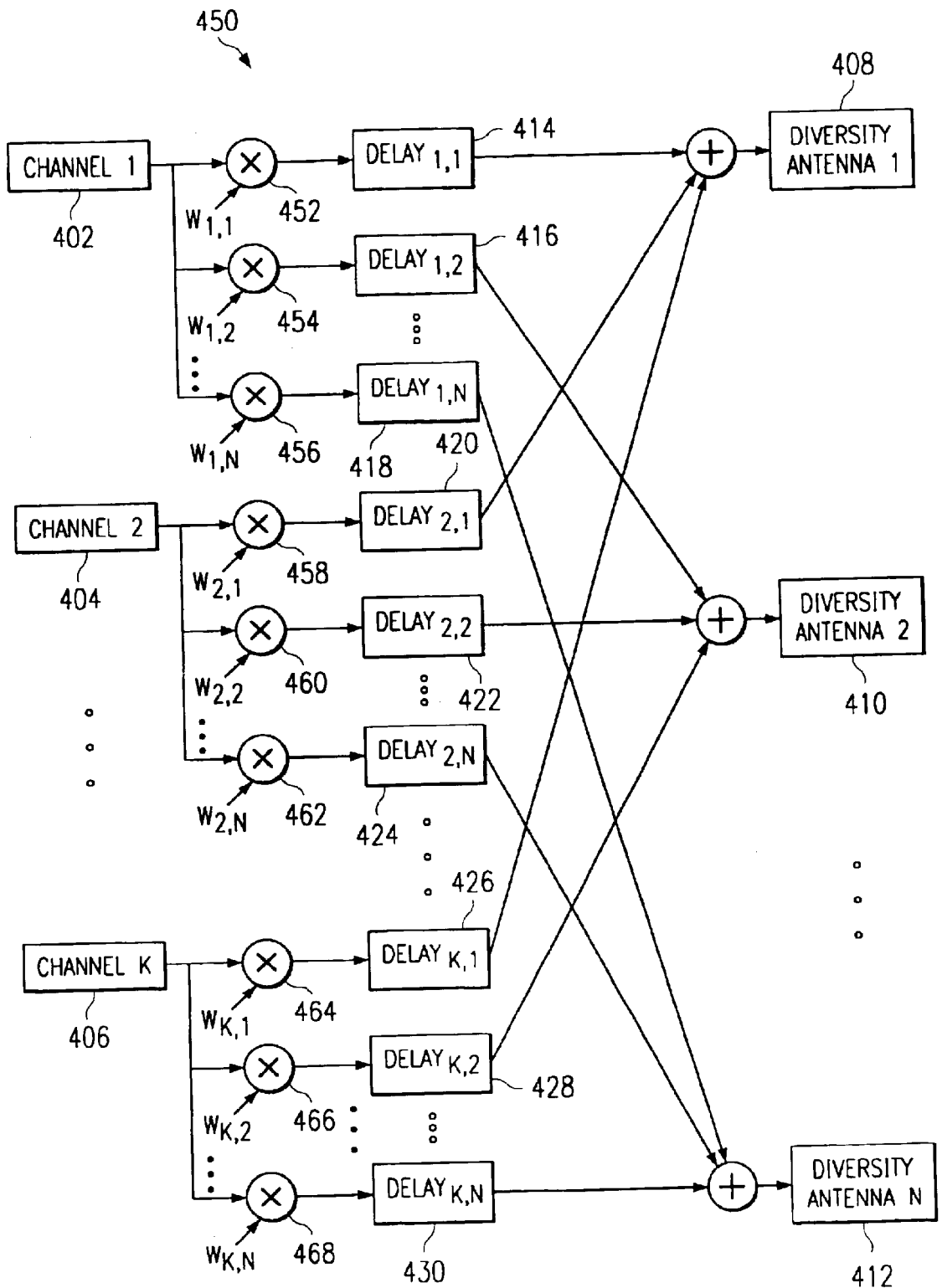
FIG. 4(b) is a block diagram illustrating one implementation of delay diversity at the base station shown in FIG. 1 and having K channels and N antennas suitable for accommodating the TDD mode of WCDMA data communication according to yet another embodiment of the present invention.

FIG. 4(b) is a block diagram 450 illustrating one implementation of delay diversity at the base station 102 shown in FIG. 1 and having K channels 402–406 and N antennas 408–412 suitable for accommodating the TDD mode of WCDMA data communication according to one embodiment of the present invention. As stated above, delay diversity within the cell 100 is accomplished by transmitting derived versions of the same signal from different antennas 408–412 with at least one distinct delay 416, 418, 420, 424, 426, 428 between any two antennas. The derived versions of the signal are obtained by scaling the amplitude and/or phase shifting via multiplier/phase shifting elements 452–468. As also stated above, the simplest form of delay diversity would involve simply transmitting the same signal from different antennas with at least one distinct delay between any two antennas such as depicted in FIG. 4(a).

Figure 5:
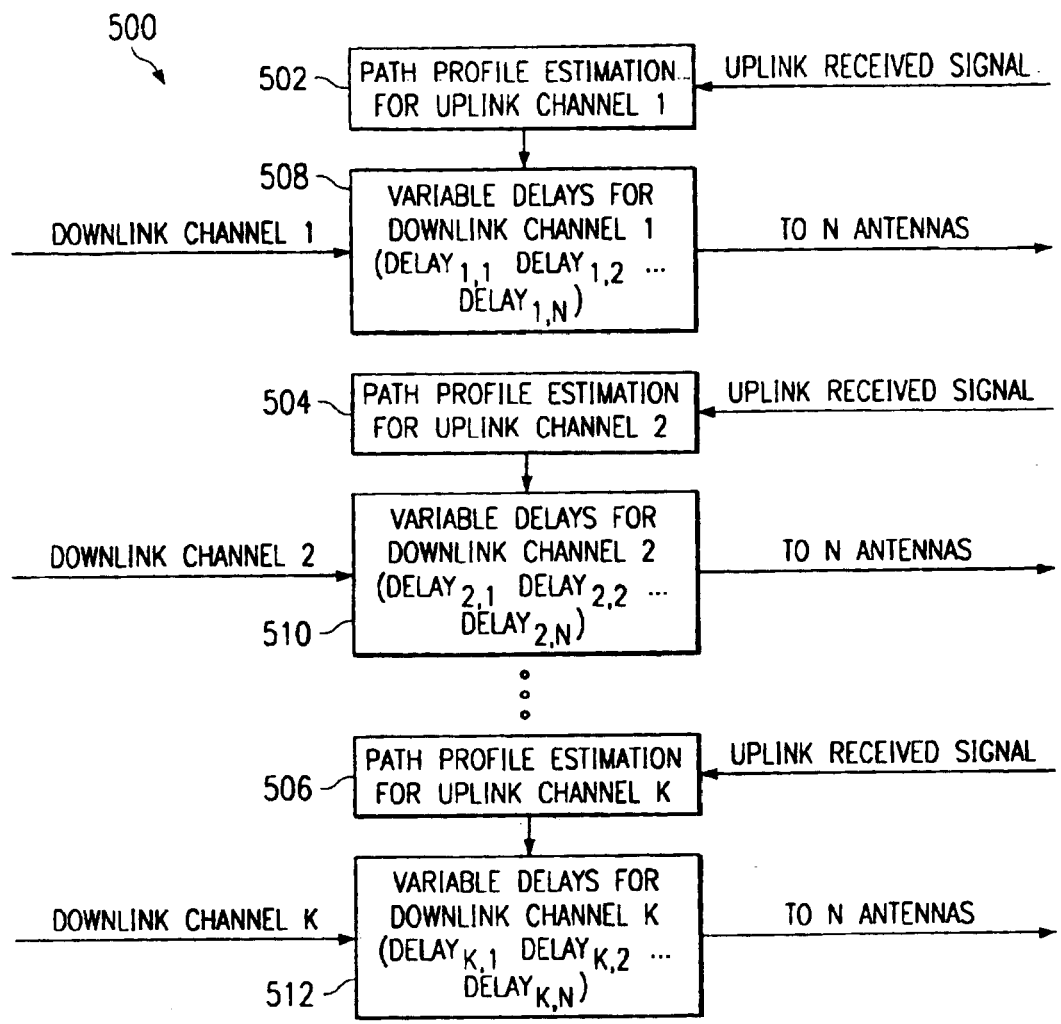
FIG. 5 is a block diagram illustrating a method of choosing channel delays associated with multiple antennas according to one embodiment of the present invention.

As seen in FIG. 5, the base station 102 must measure the delay profile 502, 504, 506 in the uplink in order to receive the uplink transmission from a mobile terminal 104, 106, 108. Therefore, no additional system complexity is required in measuring the positions of the paths in the uplink. FIG. 5 is a block diagram 500 illustrating a method of choosing channel delays 414–430 associated with multiple antennas 408–412 according to one embodiment of the present invention. Since the cell 100 shown in FIG. 1 is a time division duplex (TDD) system, the uplink and downlink profiles are identical. The delay 414–430 between the antennas 408–412 can be chosen so that the strongest signal paths between the base station 102 and the mobile terminals 104, 106, 108 do not overlap, thereby achieving full diversity. Thus, the present method is distinct from those presently known communication methods since it is adaptive in that the delay 414–430 is variable. The present method is also distinct from those presently known communication methods since it is associated with a TDD system. The delay 414–430 need not remain fixed for a particular channel 402, 404, 406, but can be altered accordingly in order to meet the needs of a changing path profile between the base station 102 and one or more mobile terminals 104, 106, 108. There is of course, less flexibility in choosing the delays between antennas for broadcast channels transmitted to all mobile terminals since the same delay is used for all users. In this case, as stated herein before, the antenna delays 414–430 can be chosen so as to benefit the maximum number of users or the users at the edge of the cell.

Figures 6, 7:
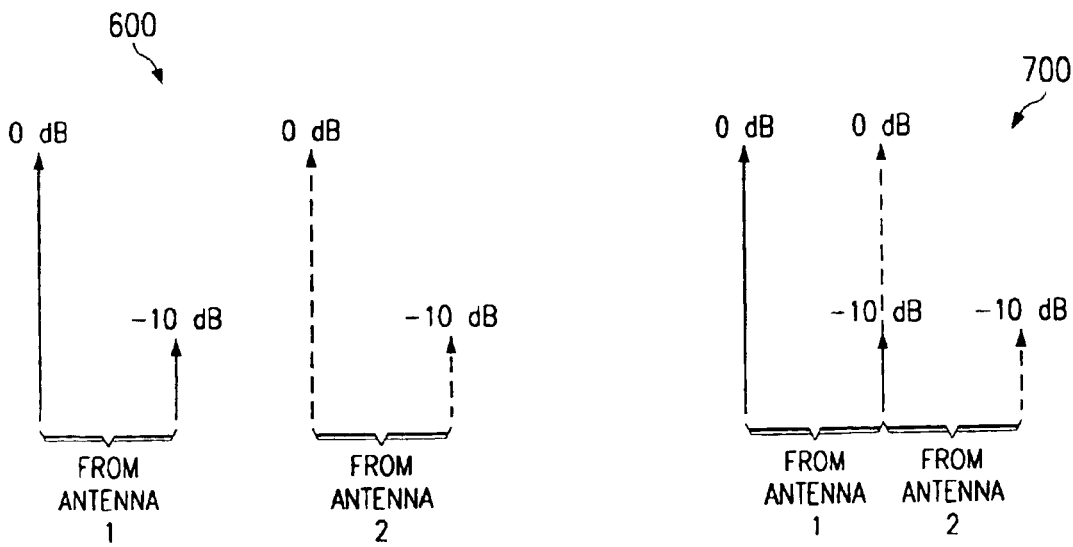
FIG. 6 is a diagram of a delay profile at a mobile terminal with a delay of 2 chips between two transmit antennas at the base station shown in FIG. 1 according to one embodiment of the present invention.
FIG. 7 is a diagram of a delay profile at a mobile terminal with a delay of 1 chip between two transmit antennas at the base station shown in FIG. 1 according to one embodiment of the present invention.

FIG. 6 is a diagram of a delay profile 600 at a mobile terminal 104, 106, 108 with a delay of 2 chips between two transmit antennas at the base station 102 shown in FIG. 1 according to one embodiment of the present invention. When the channel impulse response, for example, has two paths separated by 1-chip and having relative powers of 0 dB and −10 dB respectively, the foregoing 2-chip delay will provide the signal delay profile depicted in FIG. 6 at the mobile terminal. Since the paths from the two antennas do not overlap, there is a full 4-path diversity.

FIG. 7 is a diagram of a delay profile 700 at a mobile terminal with a delay of only 1-chip between two transmit antennas at the base station shown in FIG. 1 according to one embodiment of the present invention. When the above channel impulse response having two paths separated by 1-chip and further having relative powers of 0 dB and −10 dB respectively is transmitted with only a 1-chip delay, the signal delay profile 700 is seen by the mobile terminal. In this instance, the second path from antenna 1 overlaps with the first path from antenna 2, thereby resulting in less desirable 3-path diversity.

Space-time transmit diversity (STTD) is the open-loop transmit antenna diversity technique of choice for the frequency division duplex (FDD) mode of wideband CDMA data communication systems since it has more gain than delay diversity and does not introduce extra paths at the mobile terminal, thereby simplifying receiver complexity. STTD for TDD/WCDMA systems is discussed further in U.S. Patent Application entitled *Space Time Transmit Diversity For TDD/WCDMA Systems*, Ser. No. 09/514,452, by Dabak et al., filed on Feb. 25, 2000, and assigned to the assignee of the present invention, and is incorporated by reference herein. Further, joint detection using the zero-forcing block linear equalizer (ZF-BLE), which is a decor-relating detector, has been proposed for use at the mobile terminal in association with the time division duplex (TDD) mode of WCDMA data communication by A. Klein, G. Kaleh and P. Baier, *Zero Forcing and Minimum Mean-Square-Error Equalization for Multiuser Detection in Code-Division Multiple-Access Channels*, IEEE Trans. on Vehicular Technology, Vol. 45, No. 2, pp. 276–287 (May 1996). There are however, difficulties implementing the ZF-BLE when STTD is used since the ZF-BLE is a linear detector. These difficulties arise because conjugates of the data are transmitted on the second transmit antenna, and a linear detector can not efficiently handle conjugates of data. Further, there is a computational complexity increase of more than 100% which is not acceptable since computational power is limited at the mobile terminal 104, 106, 108.

The present delay diversity for the TDD mode of WCDMA data communication depicted in FIG. 4 does not involve transmitting conjugates of data. Therefore, the receiver at the mobile terminal 104, 106, 108 can be implemented using the ZF-BLE with to an increase in computational complexity of only about 2% to about 17% (depending on the number of users employing delay diversity) as shown in Table 1 below. The variability of computational complexity associated with the ZF-BLE shown in Table 1 is based upon 8-channels having delay diversity capabilities. The total impulse response of each channel 402, 404, 406, including the delay spread of the transmit antennas 408, 410, 412 must be kept less than the length of the channel estimation window associated with the base station 102 such that signals received by a mobile terminal 104, 106, 108 via one antenna will not overlap signals received by the mobile terminal via a different antenna. Further, the delay spread of the antennas 408, 410, 412 associated with each channel 402, 404, 406 most preferably are limited to M=16 chips or less as shown by equation (1).

$$|Delay_{k,i} - Delay_{k,j}| \leq M \text{ chips}; i \in [1,2,\ldots,N]; j \in [1,2,\ldots,N] \quad (1)$$

TABLE 1

| Total MIPS (non DD ZF-BLE) | Total MIPS (BCH DD ZF-BLE) | Total MIPS (all ch DD ZF-BLE) |
|---|---|---|
| 74.49813333 | 76.05973333 | 86.9909333 |
| MIPS increase (%) BCH DD ZF-BLE | 2.0961599 | |
| MIPS increase (%) all ch DD ZF-BLE | | 16.769279 |

Figure 8:
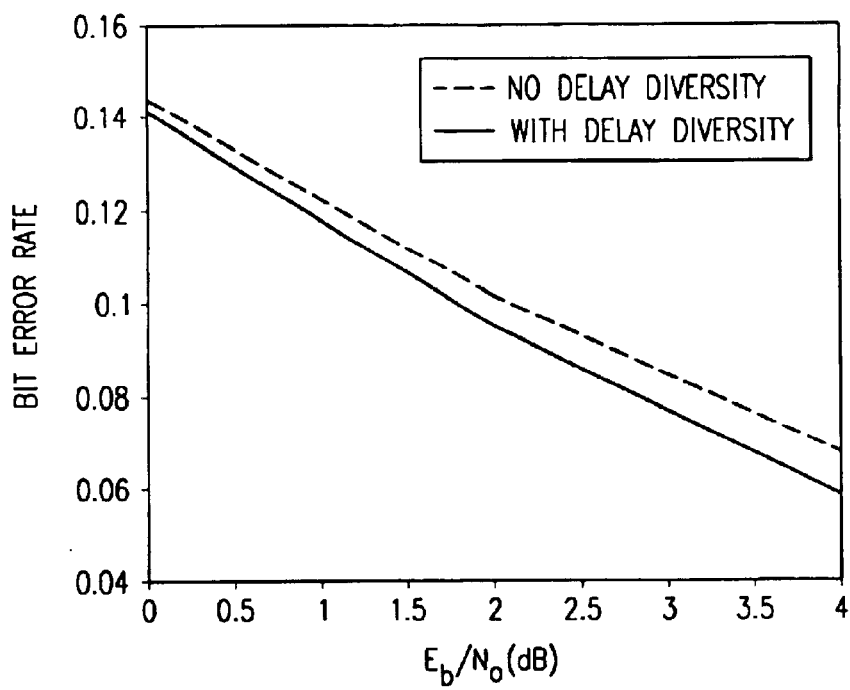
FIG. 8 is a simulation diagram showing bit error rate (BER) performance with and without delay diversity on the downlink using the Vehicular B channel model.
Figure 9:
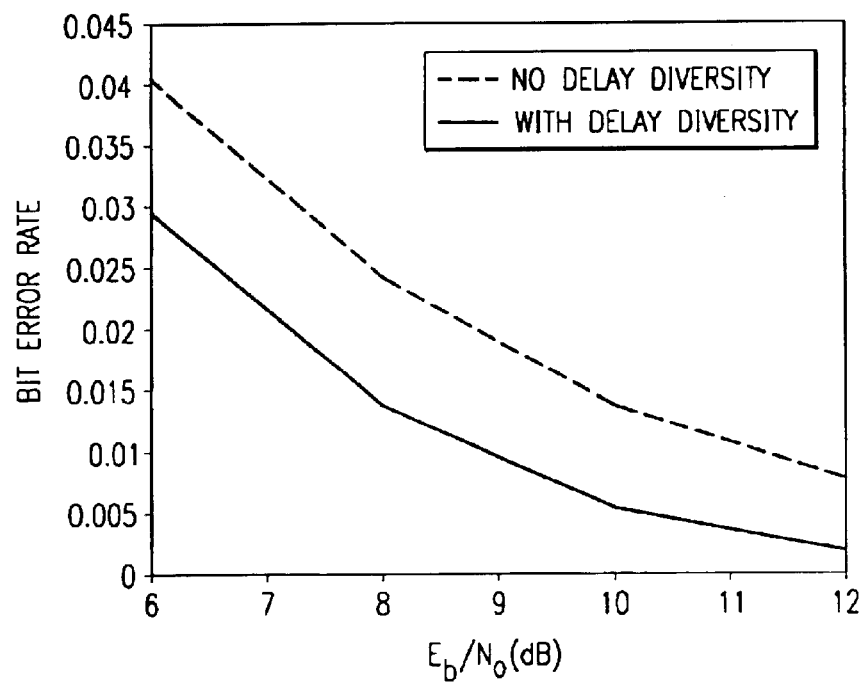
FIG. 9 is a simulation diagram showing bit error rate (BER) performance with and without delay diversity on the downlink using the Outdoor-to-Indoor and Pedestrian channel model.

FIG. 8 is a simulation diagram showing bit error rate (BER) performance with and without delay diversity on the downlink using the Vehicular B channel model and FIG. 9 is a simulation diagram showing bit error rate (BER) performance with and without delay diversity on the downlink using the Outdoor-to-Indoor and Pedestrian channel model. There is a gain of 0.3 dB at a BER of 0.10 with the Vehicular B channel and a gain of 2.4 dB at a BER of 0.01 with the Outdoor-to-Indoor and Pedestrian channel.

This invention has been described in considerable detail in order to provide those skilled in the wireless communication art with the information need to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, multiple variations in the order of symbol transmission can provide the delay diversity associated with the present invention. Further, the exemplary delay diversity of the present invention can be implemented in hardware or software, or a combination of both. In a preferred embodiment, the functions of a data communication system designed in conformance with the principals set forth herein are implemented as one or more integrated circuits. using a suitable processing technology, e.g., CMOS.

As another example, at least portions of the present invention may be implemented in computer programs, i.e. algorithms, executing on programmable computers each comprising a data processor, a data storage system, including both volatile and non-volatile memory and/or data storage devices, at least one input device, and at least one output device. Program code is applied to input data to perform the functions described herein and generate output information. The output information is applied to one or more output devices, in known fashion. Each such program may be implemented in a high level procedural or object oriented programming language to communicate with a computer system. However, the programs can be implemented in assembly or machine language, if desired. In any case, the language may be a compiled or interpreted language. Portions of the inventive structure and method may also be considered to be implemented as a computer-readable storage medium, configured with a computer program, where the storage medium so configured causes a data processor to operate in a specific and predefined manner to perform the functions described herein. An example of one such type of data processor is a digital signal processor (DSP).

What is claimed is:

1. A method of communicating data between a base station having a plurality of antennas and at least one mobile terminal, the method comprising the step of:
   transmitting from the base station, derived versions of a midamble signal to each antenna within the plurality of antennas;
   providing a distinct delay associated with each derived version of the midamble signal and its respective antenna; and
   further comprising the step of altering the distinct delay associated with a derived version of the midamble signal and its respective antenna if and when an estimated path profile associated with the specific midamble signal changes from a prior estimated path profile.

2. The method according to claim 1, wherein each derived version of the midamble signal is the midamble signal itself.

3. The method according to claim 1, wherein at least one derived version of the midamble is formed by scaling the amplitude of the midamble signal.

4. The method according to claim 1, wherein at least one derived version of the midamble is formed by shifting the phase of the midamble signal.

5. The method according to claim 1, wherein at least one derived version of the midamble is formed by scaling the amplitude and shifting the phase of the midamble signal.

6. The method according to claim 1 further comprising the step of receiving a base station generated distinct delayed time division duplex signal at a respective mobile and demodulating the distinct delayed time division duplex signal via a joint detector.

7. The method according to claim 1 further comprising the step of receiving a base station generated distinct delayed time division duplex signal at a respective mobile terminal and demodulating the distinct delayed time division duplex signal via a zero-forcing block linear equalizer.

8. The method according to claim 1 further comprising the step of receiving a base station generated distinct delayed time division duplex signal at a respective mobile terminal and demodulating the distinct delayed time division duplex signal via a zero-forcing block linear equalizer in association with decision feedback.

9. The method according to claim 1 further comprising the step of receiving a base station generated distinct delayed time division duplex signal at a respective mobile terminal and demodulating the distinct delayed time division duplex signal via a minimum-mean-square equalizer.

10. The method according to claim 1 further comprising the step of receiving a base station generated distinct delayed time division duplex signal at a respective mobile terminal and demodulating the distinct delayed time division duplex signal via a minimum-mean-square equalizer associated with decision feedback.

11. The method according to claim 1 wherein the derived versions of a midamble signal transmitted to each antenna are associated with a code division multiple access data signal.

12. A method for communicating data between a base station having a plurality of antennas and at least one mobile terminal the method comprising the steps of:
   receiving at the base station, a time division duplex mode uplink signal from each mobile terminal in communication with the base station and estimating a path profile associated with each received uplink signal;
   transmitting from the base station, a time division duplex signal to each antenna within the plurality of antennas; and
   providing from the base station a distinct delay associated with each transmitted time division duplex signal and its respective antenna.

13. The method according to claim 12 further comprising the step of altering the distinct delay associated with a specific time division duplex signal and its respective antenna if and when the estimated path profile associated with the specific time division duplex signal changes from its prior estimated path profile.

14. The method according to claim 12 further comprising the step of receiving a distinct delayed time division duplex signal at a respective mobile terminal and demodulating the distinct delayed time division duplex signal via a joint detector.

15. The method according to claim 12 further comprising the step of receiving a distinct delayed time division duplex signal at a respective mobile terminal and demodulating the distinct delayed time division duplex signal via a zero-forcing block linear equalizer.

16. The method according to claim 12 further comprising the step of receiving a distinct delayed time division duplex signal at a respective mobile terminal and demodulating the distinct delayed time division duplex signal via a zero-forcing block linear equalizer associated with decision feedback.

17. The method according to claim 12 further comprising the step of receiving a distinct delayed time division duplex signal at a respective mobile terminal and demodulating the distinct delayed tune division duplex signal via a minimum mean-square-error equalizer.

18. The method according to claim 12 further comprising the step of receiving a distinct delayed time division duplex signal at a respective mobile terminal and demodulating the distinct delayed time division duplex signal via a minimum mean-square-error equalizer associated with decision feedback.

19. The method according to claim 12 wherein the step of receiving at the base station, a time division duplex mode uplink signal from each mobile terminal in communication with the base station and estimating a path profile associated with each received uplink signal comprises the step of receiving a time division duplex code division multiple access data signal.

20. A time division duplex communication system comprising:
   a base station having a plurality of spaced apart antennas;
   signal distribution means for coupling time division duplex communication signals between the base station and the plurality of spaced apart antennas; and
   delay means operatively coupled to the plurality of spaced apart antennas and the signal distribution means for providing a distinct delay in each of the time division duplex communication signals coupled between the base station and the plurality of spaced apart antennas, wherein the delay means is operable to alter the distinct delay associated with a time division duplex communication signal if and when an estimated path profile associated with the specific time division duplex communication signal charges from a prior estimated path profile.

21. The time division duplex communication system according to claim 20 further comprising at least one mobile terminal having a joint detector for receiving and demodulating a delayed time division duplex communication signal received from the base station.

22. The time division duplex communication system according to claim 20 further comprising at least one mobile terminal having a zero-forcing block linear equalizer configured to demodulate a delayed time division duplex communication signal received from the base station.

23. The time division duplex communication system according to claim 20 further comprising at least one mobile terminal having a zero-forcing block linear equalizer having decision feedback capability and configured to demodulate a delayed time division duplex communication signal received from the base station.

24. The time division duplex communication system according to claim 20 further comprising at least one mobile terminal having a minimum-mean-square error equalizer configured to demodulate a delayed time division duplex communication signal received from the base station.

25. The time division duplex communication system according to claim 20 further comprising at least one mobile terminal having a minimum-mean-square error equalize having decision feedback capability and configured to demodulate a delayed time division duplex communication signal received from the base station.

26. The time division duplex communication system according to claim 20 wherein each time division duplex communication signal is associated with a code division multiple access data signal.

27. A data communication system comprising:
   a base station having a plurality of spaced apart antennas;
   at least one mobile terminal in communication with the base station; and
   means for providing a distinct delay associated with each antenna of the plurality of spaced apart antennas such that a time division duplex communication signal coupled between the base station and the plurality of spaced apart antennas can be demodulated within the at least one mobile terminal, wherein the delay means is operable to alter the distinct delay associated with a time division duplex communication signal if and when an estimated path profile associated with the specific time division duplex communication signal charges from a prior estimated path profile.

28. The data communication system according to claim 27 wherein the at least one mobile terminal comprises a joint detector.

29. The data communication system according to claim 27 wherein the at least one mobile terminal comprise a zero-forcing block linear equalizer.

30. The data communication system according to claim 27 wherein the at least one mobile terminal comprises a zero-forcing block linear equalizer having decision feedback capability.

31. The data communication system according to claim 27 wherein the at least one mobile terminal comprises a minimum-mean-square error equalize.

32. The data communication system according to claim 27 wherein the at least one mobile terminal comprises a minimum-mean-square error equalizer having decision feedback capability.

33. The data communication system according to claim 27 wherein the means for providing a distinct delay is capable of providing a distinct delay associated with each antenna such that a code division multiple access communication signal coupled between the base station and the plurality of spaced apart antennas can be demodulated within the at least one mobile terminal.

34. A data communication system comprising:
   a base station having a plurality of spaced apart antennas;
   means for transmitting from the base station, derived versions of a midamble signal to each antenna within the plurality of spaced apart antennas; and
   means for providing a distinct delay associated with each derived version of the midamble signal and its respective antenna within the plurality of spaced apart antennas, wherein the means for providing is operable to alter the distinct delay associated with each derived version of the midamble signal and its respective antenna if and when an estimated path profile associated with the specific midamble signal charges from a prior estimated path profile.

35. The data communication system according to claim 34 further comprising means for scaling a midamble signal to generate a derived version of the midamble signal.

36. The data communication system according to claim 34 further comprising means for phase shifting a midamble signal to generate a derived version of the midamble signal.

37. The data communication system according to claim 34 further comprising means for scaling and phase shifting a midamble signal to generate a derived version of the midamble signal.

38. The data communication system according to claim 34 further comprising at least one mobile terminal configured to receive and demodulate a time division duplex communication signal from the base station.

39. The data communication system according to claim 38 wherein the at least one mobile terminal comprises a joint detector.

40. The data communication system according to claim 38 wherein the at least one mobile terminal comprises a zero-forcing block linear equalizer.

41. The data communication system according to claim 38 wherein the at least one mobile terminal comprises a zero-forcing block linear equalizer having decision feedback capability.

42. The data communication system according to claim 38 wherein the at least one mobile terminal comprises a minimum-mean-square error equalizer.

43. The data communication system according to claim 38 wherein the at least one mobile terminal comprises a minimum-square error equalizer having decision feedback capability.

44. The data communication system according to claim 38 wherein the at least one mobile terminal is further configured to receive and demodulate a code division multiple access communication signal from the base station.

45. A data communication system comprising:
a base station configured to communicate with at least one mobile terminal, the base station a plurality of spaced apart antennas and further having;
a data processor;
a data input device in communication with the data processor;
an algorithmic software directing the data processor; and
a data storage unit, wherein discrete signal uplink data associated with at least one mobile terminal in communication with the base station is stored and supplied to the data processor such that the data processor, directed by the algorithmic software, can automatically derive midamble signal parameters using algorithmically defined relationships associated with the discrete signal uplink data such that derived midamble signals communicated between the base unit and each respective antenna will be characterized by at least one distinct signal parameter selected from the group consisting of signal delay, signal phase and signal amplitude.

46. The data communication system according to claim 45 further comprising at least one mobile terminal.

47. The data communication system according to claim 46 wherein the at least one mobile terminal comprises a joint detector configured to demodulate a time division duplex signal generated by the base station.

48. The data communication system according to claim 47 wherein the joint detector comprises a zero-forcing block linear equalizer.

49. The data communication system according to claim 47 wherein the joint detector comprises a zero-forcing block linear equalize having decision feedback capability.

50. The data communication system according to claim 47 wherein the joint detector comprises a minimum-mean-square error equalize.

51. The data communication system according to claim 47 wherein the joint detector comprises a minimum-mean-square error equalize having decision feedback capability.

52. The data communication system according to claim 45 wherein the data processor is further directed by the algorithmic software such that it can automatically determine signal path profile parameters using algorithmically defined relationships associated with the discrete signal uplink data such that a signal communicated between the base unit and each antenna will be re-characterized by a new distinct signal characteristic if and when the discrete signal uplink data received by the base unit a sufficiently changed to require that a distinct signal delay change by at least one chip from an existing distinct signal delay.

53. A time-division duplex (TDD) data communication system in which system users communicate information signals through a base station using TDD communication signals, the base station having an antenna system comprising:
a plurality of spaced apart antennas;
signal distribution means for coupling TDD communication signals between the base station and the plurality of spaced apart antennas; and
variable delay means operatively coupled to the plurality of spaced apart antennas and the signal distribution means for providing derived delays associated with the TDD communication signals and the plurality of spaced apart antennas, wherein the variable delay means comprises;
a data processor;
an algorithmic software directing the data processor; and
a data storage unit, wherein discrete signal uplink data associated
with at least one mobile terminal in communication with the base station is stored and supplied to the data processor such that the data processor, directed by the algorithmic software, can automatically determine signal path profile parameters using algorithmically defined relationships associated with the discrete signal uplink data such that a signal communicated between the base unit and each antenna will be characterized by a signal delay distinct to each antenna.

54. The time-division duplex (TDD) data communication system according to claim 53 further comprising at least one mobile terminal having a joint detector configured to demodulate a delayed TDD mode communication signal received from the base station.

55. The time-division duplex (TDD) data communication system according to claim 54 wherein the joint detector is a zero-forcing block linear equalizer.

56. The time-division duplex (TDD) data communication system according to claim 54 wherein the joint detector is a zero-forcing block linear equalizer having decision feedback capability.

57. The time-division duplex (TDD) data communication system according to claim 54 wherein the joint detector is a minimum-mean-square error equalizer.

58. The time-division duplex (TDD) data communication system according to claim 54 wherein the joint detector is a minimum-mean-square error equalizer having decision feedback capability.

59. The time-division duplex (TDD) data communication system according to claim 53 wherein the algorithmic software is configured to further direct the data processor such that the data processor can determine new signal path profile parameters to re-characterize the signal delay distinct to each antenna when the discrete signal uplink data received by the base unit are sufficiently changed to require that a distinct signal delay change by at least one chip from an existing distinct signal delay.

60. The time-division duplex (TDD) data communication system according to claim 53 wherein the TDD signal is associated with a code division multiple access data signal.

* * * * *